No. 628,791. Patented July 11, 1899.
E. GERMAINE.
HUB FOR WHEELS OF VELOCIPEDES, &c.
(Application filed Apr. 16, 1897.)
(No Model.)
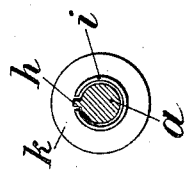
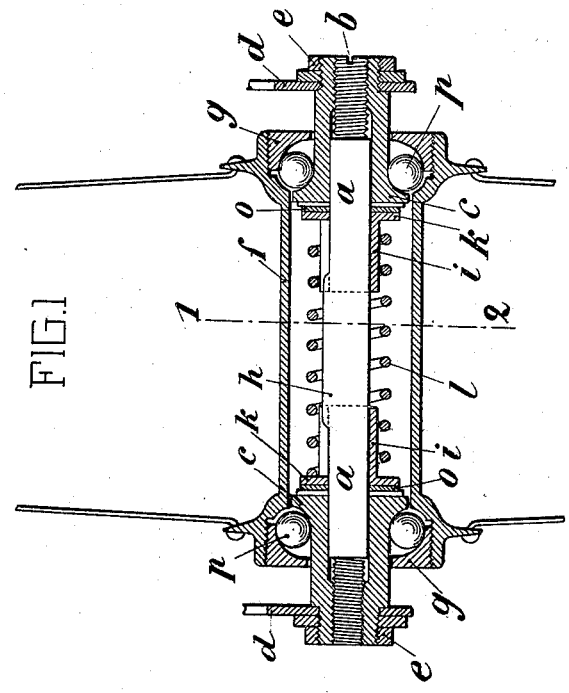
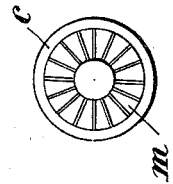
Witnesses.
Inventor.
Eugène Germaine
By Munn
Attorneys.
THE NORRIS PETERS CO., PHOTO-LITHO., WASHINGTON, D. C.

UNITED STATES PATENT OFFICE.

EUGÉNE GERMAINE, OF PARIS, FRANCE.

HUB FOR WHEELS OF VELOCIPEDES, &c.

SPECIFICATION forming part of Letters Patent No. 628,791, dated July 11, 1899.

Application filed April 16, 1897. Serial No. 632,443. (No model.)

*To all whom it may concern:*

Be it known that I, EUGÉNE GERMAINE, of the city of Paris, France, have invented an Improved Hub for the Wheels of Velocipedes and other Vehicles, (for which I have obtained Letters Patent in France for fifteen years, dated July 24, 1896, No. 258,343,) of which the following is a full, clear, and exact description.

My invention relates to an improved hub for the wheels of velocipedes and other vehicles.

In order that my invention may be properly understood, I have represented the same by way of example in the accompanying drawings, in which—

Figure 1 shows a longitudinal vertical section of the whole of my improved hub in its application to the front wheel of a velocipede. Fig. 2 is a transverse vertical section taken on the line 1 2 of Fig. 1, and Fig. 3 shows apart the interior front view of one of the regulating-cones.

In the figures the same letters of reference designate the same parts.

As shown in the drawings, the axle $a$ is screw-threaded at its two extremities and the two threads are in opposite directions. One of the extremities has a slit $b$ or a square for the operation by means of a screw-driver or a screw-wrench for effecting the regulation. Upon this axle are screwed the two cones $c$, which carry the front fork $d$, held by nuts $e$, having a shoulder. This axle traverses the hub proper, $f$, presenting at its extremities parts screw-threaded in opposite directions for receiving the covering-plates $g$.

In order to prevent the cones being unscrewed in consequence of the vibrations during the rolling movement of the wheel, the axle $a$ carries upon a portion of its length a tenon $h$, engaging with the slits in the rings $i$. These rings $i$ carry each a flange $k$, and a spring $l$ bears constantly against these flanges. Between each of the flanges $k$ and the ratchet-faces $m$ of the cones $c$ is placed a washer $o$ of leather, rubber, or any other material. These devices hold the cones $c$ from turning on the axle $a$.

The balls $p$ are placed between the cones $c$ and the plates $g$.

I claim—

1. In an adjustable bearing, the combination with a spindle, of an adjusting bearing member screw-threaded thereon and provided with an engaging portion, a locking device longitudinally movable with relation to said spindle and having an engaging portion to coöperate with that of the bearing member, a spring to maintain said locking device normally in engagement with said adjusting member, and means for preventing relative rotation of said spindle and locking member.

2. The combination of an axle, two cones screwed on the axle, two collars having non-rotative connection with the axle and located between the cones, and a spring for pressing the collars respectively against the cones whereby to hold the cone by the engagement of the collars therewith.

3. The combination of an axle, a cone mounted for rotation on the axle and having a cut face, a collar non-rotatively mounted on the axle, and a spring pressing the collar against the cut face of the cone.

The foregoing specification of my improved hub for the wheels of velocipedes and other vehicles signed by me this 16th day of March, 1897.

EUGÉNE GERMAINE.

Witnesses:
EDWARD P. MACLEAN,
MAURICE H. PIGNET.